(12) United States Patent
Park et al.

(10) Patent No.: US 10,001,165 B2
(45) Date of Patent: Jun. 19, 2018

(54) THRUST MAGNETIC BEARING FOR BIAS COMPENSATION

(71) Applicant: KOREA INSTITUTE OF MACHINERY & MATERIALS, Daejeon (KR)

(72) Inventors: Cheol-hoon Park, Daejeon (KR); Sang-Kyu Choi, Daejeon (KR); Sang-Yong Ham, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 250 days.

(21) Appl. No.: 14/674,022

(22) Filed: Mar. 31, 2015

(65) Prior Publication Data

US 2015/0316097 A1 Nov. 5, 2015

(30) Foreign Application Priority Data

May 2, 2014 (KR) ........................ 10-2014-0053178

(51) Int. Cl.
*H02K 7/09* (2006.01)
*F16C 32/04* (2006.01)
*H02K 1/17* (2006.01)

(52) U.S. Cl.
CPC ...... *F16C 32/0476* (2013.01); *F16C 32/0459* (2013.01); *F16C 32/0465* (2013.01); *F16C 32/0472* (2013.01); *H02K 1/17* (2013.01); *H02K 7/09* (2013.01); *F16C 2300/02* (2013.01)

(58) Field of Classification Search
CPC ........ H02K 7/09; H02K 1/17; F16C 32/0476; F16C 32/0472; F16C 32/0459
USPC ................................... 310/90.5, 268, 156.32
IPC ..................................................... H02K 007/09
See application file for complete search history.

(56) References Cited

U.S. PATENT DOCUMENTS

| 4,920,291 | A | * | 4/1990 | McSparran | ......... F16C 32/0459 310/90.5 |
| 5,043,615 | A | | 8/1991 | Oshima | |
| 5,179,308 | A | * | 1/1993 | Malsky | ............... F16C 32/0459 310/90.5 |
| 5,250,865 | A | * | 10/1993 | Meeks | ................ F16C 32/0465 310/90.5 |
| 5,514,924 | A | * | 5/1996 | McMullen | .......... F16C 32/0485 310/90.5 |
| 5,574,322 | A | * | 11/1996 | Nii | ...................... F16C 33/1035 310/156.04 |

(Continued)

FOREIGN PATENT DOCUMENTS

| CN | 1049547 | 2/1991 |
| CN | 101115930 | 1/2008 |

(Continued)

*Primary Examiner* — Thomas Truong
(74) *Attorney, Agent, or Firm* — Lex IP Meister, PLLC

(57) ABSTRACT

The present invention relates to a thrust magnetic bearing for bias compensation, and more particularly, to a thrust magnetic bearing for bias compensation in which annular permanent magnets and electromagnets are disposed to face each other with respect to a levitated member and the permanent magnets are formed to be asymmetrical in lengths thereof in an axial direction to thus exert an attractive force for compensating for a bias by the difference in the lengths of the permanent magnets in the axial direction to compensate for the bias, and a current supply for bias magnetic flux is not required, saving energy.

3 Claims, 5 Drawing Sheets

(56) References Cited

U.S. PATENT DOCUMENTS

| | | | |
|---|---|---|---|
| 5,894,181 A * | 4/1999 | Imlach | F16C 32/0429 310/90.5 |
| 9,041,266 B2 | 5/2015 | Park et al. | |
| 2008/0122308 A1 | 5/2008 | Mleux | |

FOREIGN PATENT DOCUMENTS

| | | |
|---|---|---|
| CN | 102792039 | 11/2012 |
| JP | 2001-146917 | 5/2001 |
| KR | 2009-0070178 | 7/2009 |
| KR | 10-1343876 | 12/2013 |

\* cited by examiner

THRUST MAGNETIC BEARING FOR BIAS COMPENSATION

CROSS-REFERENCE TO RELATED APPLICATION

This application claims priority to and the benefit of Korean Patent Application No. 10-2014-0053178 filed in the Korean Intellectual Property Office on May 2, 2014, the entire contents of which are incorporated herein by reference.

BACKGROUND OF THE INVENTION (a) Field of the Invention

The present invention relates to a thrust magnetic bearing for bias compensation, and more particularly, to a thrust magnetic bearing for bias compensation in which annular permanent magnets and electromagnets are disposed to face each other with respect to a levitated member, and the permanent magnets are formed to be asymmetrical in lengths thereof in an axial direction to thus compensate for a bias by the difference in the lengths of the permanent magnets in the axial direction.

(b) Description of the Related Art

Related art general bearings frictionally contact with each other, and thus, magnetic bearings minimizing frictional contact have been commonly used in various fields.

As disclosed in Korean Patent Laid-Open Publication No. 2009-0070178 (Entitled: "Cylindrical System For Measuring Displacement In Radial Direction of Magnetic Bearing Using Capacitance And Method For Determining Fault Thereof", Publication Date: 2009 Jul. 1), magnets or electromagnets assuming strong magnetism are disposed on the circumference of a rotational shaft and levitated member floats the rotational shaft by magnetic levitation to serve as a bearing.

The magnetic bearing described above is advantageous in that, since it is not in contact with the shaft or the levitated member, frictional contact is eliminated, and since components thereof are not worn and damaged, high durability thereof is obtained and less noise is created.

FIG. 1 is a view illustrating an example of a related art active thrust magnetic bearing in which a levitated member is supported only by electromagnets.

The active thrust magnetic bearing illustrated in FIG. 1 uniformly maintains a position of a levitated member by adjusting an amount of current supplied to an electromagnetic coil according to positions of the levitated member.

However, in the active thrust magnetic bearing illustrated in FIG. 1, since bias magnetic force needs to be applied to the levitated member in advance, a constant bias current should be continuously supplied, causing high energy loss to degrade efficiency and cause an excessive temperature increase.

FIG. 2 is a view illustrating an example of a related art hybrid thrust magnetic bearing in which electromagnets support a levitated member together with permanent magnets.

The hybrid thrust magnetic bearing in which electromagnets and permanent magnets are provided together illustrated in FIG. 2 has been devised to overcome the shortcomings of the active thrust magnetic bearing illustrated in FIG. 1. In the hybrid thrust magnetic bearing, a bias magnetic force is formed in advance using the annular permanent magnets, and a position of the levitated member is controlled by adjusting an amount of current applied to the electromagnets.

In the hybrid thrust magnetic bearing in which the electromagnets and permanent magnets are provided together as illustrated in FIG. 2, since a current supply for bias magnetic flux is not required, energy may be saved and a temperature increase is low.

However, as illustrated in FIG. 3, in the hybrid thrust magnetic bearing in which the electromagnets and permanent magnets are provided together, in a case in which a shaft is disposed in a longitudinal direction and a permanent magnet cannot be attached to a rotor, in particular, to an upper surface of the rotor supported by a magnetic bearing, current for compensating for gravitational force should be continuously supplied.

In detail, in the case of the rotor disposed in a longitudinal direction and supported by a magnetic bearing, generally, a permanent magnet is disposed on an upper surface of the rotor in order to compensate for gravitational force acting on the rotor by using attractive force of the permanent magnet.

However, in a device such as a turbo machine in which an impeller is attached to an upper portion thereof or a device such as a centrifugal separator in which a bucket is attached to an upper portion thereof, a permanent magnet for compensating for gravitational force of a rotor cannot be attached to an upper portion of the rotor.

Therefore, in order to solve this problem, a current should be continuously supplied to compensate for gravitational force of the rotor, which results in a large amount of energy loss and a significant temperature increase.

RELATED ART

Patent Document (Patent document 1) Korean Patent Laid-Open Publication No. 2009-0070178 (Entitled: "Cylindrical System For Measuring Displacement In Radial Direction of Magnetic Bearing Using Capacitance And Method For Determining Fault Thereof", Publication Date: 2009 Jul. 1)

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a thrust magnetic bearing with acting attractive force in which a plate-like levitated member protruding in a direction perpendicular to a rotational shaft floats by an annular magnet unit surrounding the rotational shaft to support a rotor, wherein the magnet unit includes annular permanent magnets and electromagnets to face each other with respect to the levitated member, and the permanent magnets are formed to be asymmetrical in lengths thereof in an axial direction to thus compensate for a bias by the difference in the lengths of the permanent magnets in the axial direction.

An exemplary embodiment of the present invention provides a thrust magnetic bearing in which a rotor is supported by enabling a plate-like levitated member protruding in a direction perpendicular to a rotational shaft to float by means of the rotational shaft, the rotor including the rotational shaft, and an annular magnet unit surrounding the rotational shaft, wherein the magnet unit includes: a first magnet unit having a first annular electromagnet provided on one surface and spaced apart from the levitated member by a predetermined distance and a first annular permanent magnet provided on one side of the first electromagnet; and a second magnet unit having a second annular electromagnet provided in a position facing the first electromagnet on the other surface with respect to the levitated member and a second annular permanent magnet provided in a position facing the first permanent magnet.

The first permanent magnet may have a length D1 in the axial direction, the second permanent magnet may have a length D2 in the axial direction, and the lengths D1 and D2 may be asymmetrical.

The magnet unit may be formed of at least on material selected from among carbon, a resin, a metal, a porous metal, and a metal mesh.

The thrust magnetic bearing for bias compensation may further include a space measurement sensor provided on one side of the magnet unit and configured to measure spaces between the levitated member, provided in a space between the first magnet unit and the second magnet unit, the first magnet unit, and the second magnet unit.

According to an exemplary embodiment of the present invention, in the thrust magnetic bearing with acting attractive force in which a plate-like levitated member protruding in a direction perpendicular to a rotational shaft floats by an annular magnet unit surrounding the rotational shaft to support a rotor, since the magnet unit includes annular permanent magnets and electromagnets to face each other with respect to the levitated member, a current supply for bias magnetic flux is not necessary, saving energy and lowering a temperature increase.

Also, in the thrust magnetic bearing according to an exemplary embodiment of the present invention, since the permanent magnets are formed to be asymmetrical in length in the axial direction, an attractive force sufficient for compensating for a bias by the difference in the lengths in the axial direction may act.

Further, in the thrust magnetic bearing according to an exemplary embodiment of the present invention, in the case of a magnetic bearing supporting a vertical rotor including a shaft formed in a longitudinal direction, the length of a permanent magnet disposed in an upper portion with respect to the levitated member is set to be greater than the length of a permanent magnet disposed in a lower portion with respect to the levitated member, whereby an attractive force acts in an upward direction by the difference in the lengths in the axial direction to compensate for the gravitation of the rotor.

Also, since the gravitational force of the rotor is compensated by enabling an attractive force to act in the upward direction by the difference in the lengths of the permanent magnets in the axial direction, there is no need to continuously supply a current for compensating for gravitational force, which leads to a reduction in energy loss and prevents a significant temperature increase.

DESCRIPTION OF SYMBOLS

Figure 1:
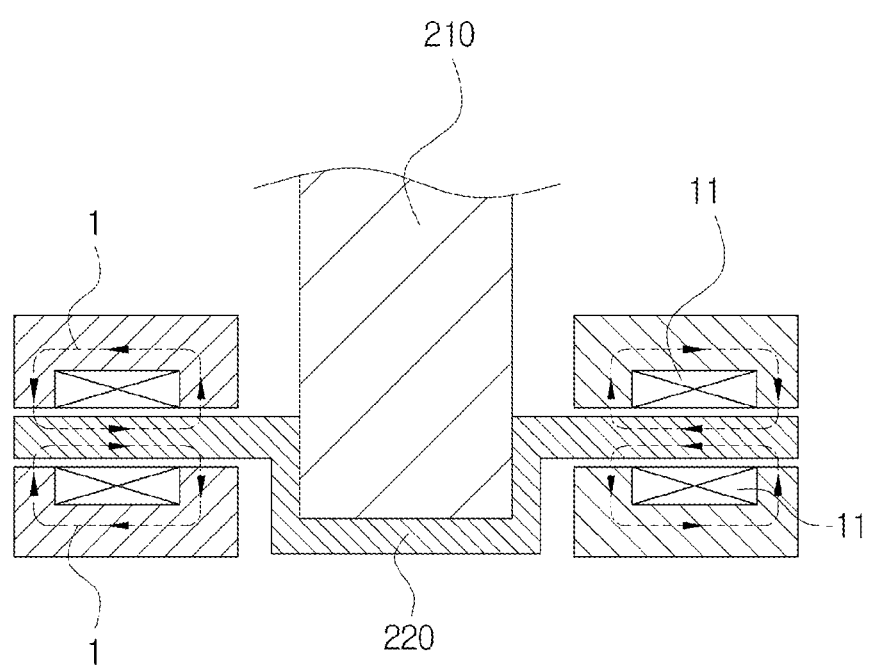
FIG. 1 is a view illustrating a related art electromagnet thrust magnetic bearing.

1000: thrust magnetic bearing for bias compensation
100: magnet unit
110: first magnet unit
120: second magnet unit
11: electromagnet
11-1: first electromagnet
11-2: second electromagnet
12: permanent magnet
12-1: first permanent magnet
12-2: second permanent magnet
D1: length of first permanent magnet in axial direction
D2: length of second permanent magnet in axial direction
1: magnetic flux based on electromagnet
2: magnetic flux based on permanent magnet
200: rotor
210: rotational shaft
220: levitated member

DETAILED DESCRIPTION OF THE EMBODIMENTS

Hereinafter, a thrust magnetic bearing for bias compensation according to an exemplary embodiment of the present invention will be described in detail with reference to the accompanying drawings.

Terms or words used in the specification and claims should not be limited and construed as common or dictionary meanings, and should be construed as meanings and concepts according to the technical spirit of the present invention based on the principle that the inventor can appropriately define the concept of each term for describing the invention in the best way.

The exemplary embodiment described in the present disclosure and the configuration illustrated in the drawings are merely the most preferred embodiment of the present invention, rather than representing all the technical concepts of the present invention, so the present invention is meant to cover all modifications, similarities, and alternatives which are included in the spirit and scope of the present invention at the time of filing of the present invention.

Figure 2:
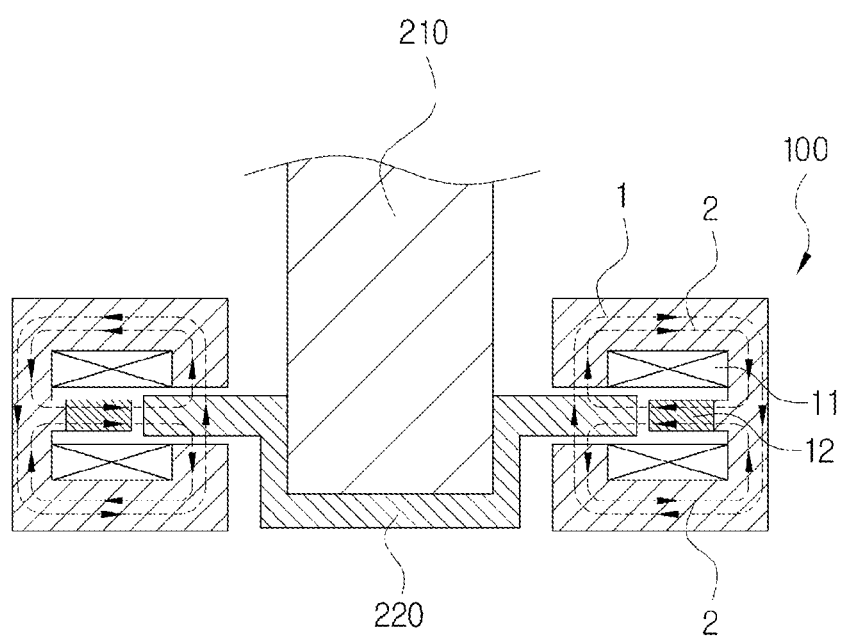
FIG. 2 is a view illustrating a related art electromagnet thrust magnetic bearing including permanent magnets.
Figure 3:
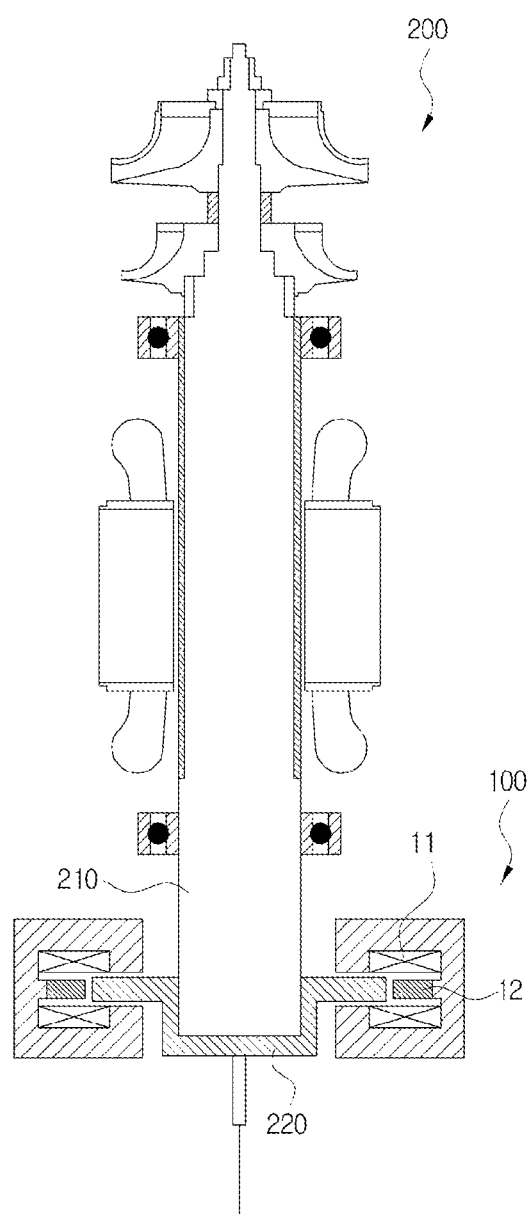
FIG. 3 is a view illustrating a related art rotor in which a permanent magnet cannot be provided in an upper portion thereof.
Figure 4:
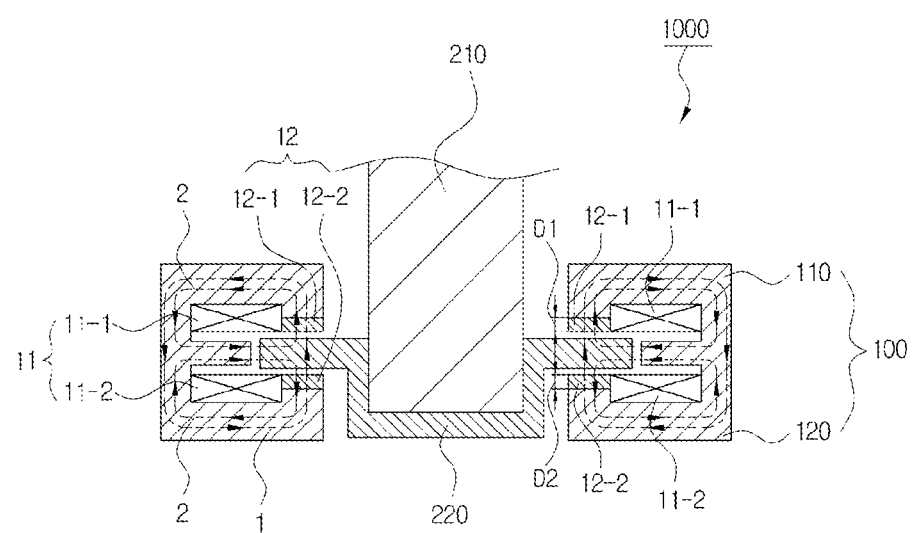
FIG. 4 is a view illustrating a thrust magnetic bearing for bias compensation according to an exemplary embodiment of the present invention.
Figure 5:
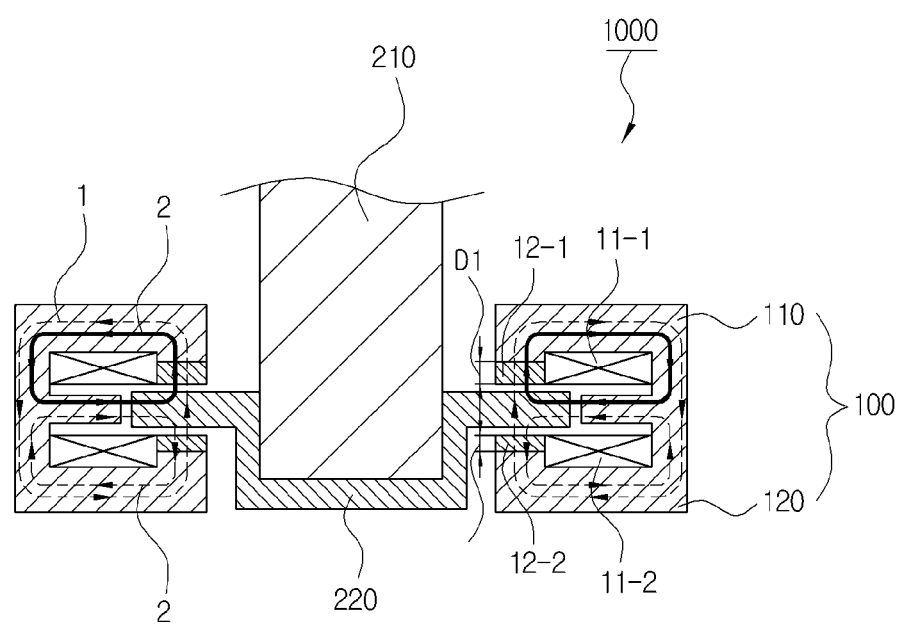
FIG. 5 is a view illustrating an example of the thrust magnetic bearing for bias compensation according to an exemplary embodiment of the present invention.

FIG. 1 is a view illustrating a related art electromagnet thrust magnetic bearing, FIG. 2 is a view illustrating a related art electromagnet thrust magnetic bearing including permanent magnets, FIG. 3 is a view illustrating a related art rotor in which a permanent magnet cannot be provided in an upper portion thereof, FIG. 4 is a view illustrating a thrust magnetic bearing for bias compensation according to an exemplary embodiment of the present invention, and FIG. 5 is a view illustrating an example of the thrust magnetic bearing for bias compensation according to an exemplary embodiment of the present invention.

In a thrust magnetic bearing 1000 for bias compensation according to an exemplary embodiment of the present invention, in a case in which a shaft is disposed in a longitudinal direction and permanent magnets 12 for compensating for the gravitational force of a rotor 200 supported by the magnetic bearing cannot be attached to an upper portion of the rotor 200, attractive force is generated by a difference in thicknesses between the permanent magnets 12 to thereby compensate for the gravitational force of the rotor 200.

As illustrated in FIG. 4, in the thrust magnetic bearing 1000 for bias compensation according to an exemplary embodiment of the present invention, a plate-shaped levitated member 220 protruding in a direction perpendicular to a rotational shaft 210 floats by the rotational shaft 210, the rotor 200 including the rotational shaft 210, and an annular magnet unit 100 surrounding the rotational shaft 210 to support the rotor 200, and here, the magnet unit 100 may include a first magnet unit 110 and a second magnet unit 120.

The first magnet unit 110 includes a first electromagnet 11-1, as an annular electromagnet 11, provided on one surface of the magnet unit 100 and spaced apart from the levitated member 220 by a predetermined distance, and a first permanent magnet 12-1, as an annular permanent magnet 12, provided on one side of the first electromagnet 11-1.

The second magnet unit 120 is formed on the other surface of the magnet unit 100 with respect to the levitated member 220, and includes a second electromagnet 11-2, as an annular electromagnet 11, provided to face the first electromagnet 11-1, and a second permanent magnet 12-2, as an annular permanent magnet 12, provided in a position facing the first permanent magnet 12-1.

An operation of the thrust magnetic bearing for bias compensation according to an exemplary embodiment of the present invention described above will now be described. When power is supplied, magnetic flux is generated in the first electromagnet 11-1 and the second electromagnet 11-2.

The levitated member 220 is under force of magnetic flux 2 based on the permanent magnets generated by the first permanent 12-1 and the second permanent magnet 12-2 and magnetic flux 1 based on electromagnets generated by the first electromagnet 11-1 and the second electromagnet 11-2, and the levitated member 220 floats in a space between the first magnet unit 110 and the second magnet unit 120 of the magnet unit 100 by virtue of the magnetic flux 2 based on the permanent magnets and the magnetic flux 1 based on the electromagnets.

This is based on a magnetic levitation principle, and the thrust magnetic bearing 1000 for bias compensation according to an exemplary embodiment of the present invention supports the rotor 200 by using the magnetic levitation principle such that the levitated member 220 floats.

Here, a position of the levitated member 220 floating between the first magnet unit 110 and the second magnet unit 120 of the magnet units 100 may be controlled by adjusting strength, direction, period, and the like, of power supplied to the first electromagnet 11-1 and the second electromagnet 11-2.

That is, in the thrust magnetic bearing 1000 for bias compensation according to an exemplary embodiment of the present invention, the magnetic flux 2 based on the permanent magnets including the first permanent magnet 12-1 and the second permanent magnet 12-2 is used as bias magnetic flux, biased magnetism, and the magnetic flux 1 based on the electromagnets including the first electromagnet 11-1 and the second electromagnet 11-2 is formed as a position controlling magnetic flux 1 for controlling a position of the levitated member 220, whereby a current supply for bias magnetic flux is not required, enhancing economical efficiency and saving energy, and having a low temperature increase.

Here, the first permanent magnet 12-1 has a thickness, namely, a length D1 in an axial direction, and the second permanent magnet 12-2 has a length D2 in the axial direction, and when the lengths D1 and D2 in the axial direction are asymmetrical, a bias acting on the rotor 200 may be compensated.

In other words, in the thrust magnetic bearing 1000 for bias compensation according to an exemplary embodiment of the present invention, since the length D1 of the first permanent magnet 12-1 in the axial direction and the length D2 of the second permanent magnet 12-2 in the axial direction are formed to be asymmetrical, an amount of bias magnetic flux, i.e., the magnetic flux 2, based on the permanent magnets formed by the first permanent magnet 12-1 and the second permanent magnet 12-2, may be varied.

This is to generate attractive force sufficient for compensating for a bias by a difference between the lengths D1 and D2 of the first permanent magnet 12-1 and the second permanent magnet 12-2 in the axial direction, and the bias acting on the rotor 200 may be compensated by the attractive force.

FIG. 5 is a view illustrating an example for compensating for gravitational force as a bias acting on the rotor 200 supported by the magnetic bearing.

The contents described above will be described in more detail. The exemplary embodiment illustrated in FIG. 5 is a device in which the rotor 200 is disposed in a longitudinal direction and supported by a magnetic bearing, but it is a device such as a turbo machine in which an impeller is attached to an upper portion or a centrifugal separator in which a bucket is attached to an upper portion thereof, so that the permanent magnet 12 for compensating for gravitational force cannot be disposed above the rotor 200.

The rotor 200 above which the permanent magnet 12 for compensating for gravitational force as described above cannot be disposed is illustrated in FIG. 3, and as illustrated in FIG. 3, the permanent magnet 12 for compensating for gravitational force acting on the rotor 20 cannot be disposed above the rotor 200.

Thus, in the thrust magnetic bearing 1000 for bias compensation according to an exemplary embodiment of the present invention, the length D1 of the first permanent magnet 12-1 formed in the upper portion with respect to the levitated member 220 is set to be greater than the length D2 of the second permanent magnet 12-2 formed in the lower portion with respect to the flowing member 200 to increase an amount of the magnetic flux 2 based on the permanent magnet formed by the first permanent magnet 12-1 to be more than an amount of the magnetic flux 2 based on the permanent magnet formed by the second permanent magnet 12-2, thus allowing an attractive force to act upwardly by bias magnetic flux formed by the difference in lengths D1 and D2 in the axial direction.

In other words, the length D1 of the upper first permanent magnet is set to be greater than the length D2 of the lower second permanent magnet to allow an attractive force to act in the upward direction by the difference in the lengths of the permanent magnets in the axial direction to compensate for the gravitational force acting on the rotor 200.

Thus, there is no need to continuously supply a current, which leads to a reduction in energy loss and prevents a significant temperature increase, compared with the related art bearing to which a current for compensating for gravitational force needs to be continuously supplied because the permanent magnet 12 for compensating for gravitational force cannot be disposed.

In addition, the thrust magnetic bearing 1000 for bias compensation according to an exemplary embodiment of the present invention may further include a space measurement sensor (not shown) provided on one side of the magnet unit 100 to measure a space between the first magnet unit 110 and the second magnet unit 120 of the magnet unit 100 and the levitated member 200.

That is, in the thrust magnetic bearing 1000 for bias compensation according to an exemplary embodiment of the present invention, since the space measurement sensor is provided on one side of the magnet unit 100, a space may be measured by the space measurement sensor to smoothly control an operation of the bearing and a position of the levitated member 220.

Also, the thrust magnetic bearing 1000 for bias compensation according to an exemplary embodiment of the present invention is a magnetic bearing free from frictional contact with respect to the rotor, eliminating the necessity of a lubricant, and a housing in which the first electromagnet 11-1, the second electromagnet 11-2, the first permanent magnet 12-1, and the second permanent magnet 12-2 of the magnet unit 100 are provided is formed of a metal such as carbon, a resin, a metal, a porous metal, or a metal mesh.

The housing of the magnet unit 100 including the first permanent magnet 12-1 and the second permanent magnet 12-2 having different lengths in the axial direction may be easily manufactured with the foregoing material and a position in which the foregoing space measurement sensor is to be provided on the magnet unit 100 may be freely selected, increasing a degree of freedom of design.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thrust magnetic bearing in which a rotor is supported by enabling a plate-like levitated member protruding in a direction perpendicular to a rotational shaft to float by means of the rotational shaft, the rotor including the rotational shaft, and an annular magnet unit surrounding the rotational shaft, wherein the magnet unit comprises:
a first magnet unit having a first annular electromagnet provided on an upper surface and spaced apart from the levitated member by a predetermined distance and a first annular permanent magnet provided on one side of the first electromagnet; and
a second magnet unit having a second annular electromagnet provided in a position facing the first electromagnet on a lower surface with respect to the levitated member and a second annular permanent magnet provided in a position facing the first permanent magnet,
wherein a direction of magnetization of the first annular permanent magnet and second annular permanent magnet is parallel to a longitudinal direction of the rotational shaft,
wherein a portion of the first permanent magnet, which is facing the second permanent magnet, has a length D1 in an axial direction, the second permanent magnet has a length D2 in the axial direction, and the length D1 is greater than the length D2,
wherein an outer circumferential surface of the first annular permanent magnet contacts an inner circumferential surface of the first annular electromagnet,
wherein an outer circumferential surface of the second annular permanent magnet contacts an inner circumferential surface of the second annular electromagnet, and
an inner circumferential surface of the first annular permanent magnet directly faces the rotational shaft.

2. The thrust magnetic bearing of claim 1, wherein the magnet unit is formed of at least one material selected from among carbon, a resin, a metal, a porous metal, and a metal mesh.

3. The thrust magnetic bearing of claim 1, further comprising a space measurement sensor provided on one side of the magnet unit and configured to measure spaces between the levitated member, provided in a space between the first magnet unit and the second magnet unit.

* * * * *